US007069537B2

(12) United States Patent
Lazarov

(10) Patent No.: US 7,069,537 B2
(45) Date of Patent: Jun. 27, 2006

(54) TECHNIQUES FOR PARTIAL LOADING OF A CONFIGURATION ASSOCIATED WITH A CONFIGURATION MODEL

(75) Inventor: Ivan Lazarov, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 526 days.

(21) Appl. No.: 10/644,945

(22) Filed: Aug. 19, 2003

(65) Prior Publication Data

US 2005/0044525 A1 Feb. 24, 2005

(51) Int. Cl.
*G06F 9/44* (2006.01)
*G06F 9/45* (2006.01)
*G06F 9/445* (2006.01)

(52) U.S. Cl. .................. 717/104; 717/120; 717/144; 717/155; 717/178

(58) Field of Classification Search ................ 717/104, 717/106–107, 120, 144, 155–157, 178; 700/30; 707/102
See application file for complete search history.

(56) References Cited

U.S. PATENT DOCUMENTS

| 6,266,805 | B1 * | 7/2001 | Nwana et al. | 717/104 |
| 6,272,672 | B1 * | 8/2001 | Conway | 717/107 |
| 6,314,555 | B1 * | 11/2001 | Ndumu et al. | 717/101 |
| 6,931,622 | B1 * | 8/2005 | Aldrich et al. | 717/107 |
| 6,952,620 | B1 * | 10/2005 | Cherdron et al. | 700/30 |
| 6,976,029 | B1 * | 12/2005 | Venkatesh et al. | 707/102 |
| 6,993,745 | B1 * | 1/2006 | Ballantyne et al. | 717/109 |

OTHER PUBLICATIONS

Title: TAOS: Testing with Analysis and Oracle Support, author: Richardson, ACM, 1994.*
Title: Developing and Integrating ProDAG in the Arcadia Environment, author: Richardson et al, ACM, 1992.*
Roman Barták, "Theory and Practice of Constraint Propagation," Proceedings of the 3$^{rd}$ Workshop on Constraint Programming in Decision and Control, Jun. 2001, Poland, 8 pages.
Roman Barták, "Constraint Programming: In Pursuit of the Holy Grail," Proceedings of the Week of Doctoral Students (WDS99), Part IV, MatFyzPress, Prague, Jun. 1999, pp. 555-564.

(Continued)

*Primary Examiner*—Chameli C. Das
(74) *Attorney, Agent, or Firm*—Hickman Palermo Truong & Becker LLP; John D. Henkhaus

(57) ABSTRACT

In the context of a constraint-based or rule-based model, in which nodes are interrelated by constraints, rules, and conditions, addition of and changes to nodes need to be validated against relevant constraints. A mechanism is provided for performing such validation without loading the entire configuration, which includes a set of constraints and a set of node variables. In response to an intent to modify a node, a subset of the set of constraints is determined, which includes all constraints that restrict the intent to modify. Further, a subset of the set of node variables is determined, which includes all node variables that may have values that affect whether any of the subset of constraints is violated. A subset of node variable information is loaded into volatile memory, which includes only information about the subset of node variables, rather than information about all of the nodes of the model.

27 Claims, 6 Drawing Sheets

OTHER PUBLICATIONS

Oracle Corporation, "Oracle® Configurator Developer, User's Guide," Release 11i for Windows 95/98/2000 and Windows NT 4.0, Apr. 2002, Part No. A87529-04, pp. 1-330 (text provided on CD-ROM).

Oracle Corporation, "Oracle® Configurator, Performance Guide," Release 11i, Apr. 2002, Part No. A95986-01, pp. 1-138 (text provided on CD-ROM).

Oracle Corporation, "Oracle® Configurator, Release Notes," Release 11i, Aug. 2002, Part No. A73283-12, pp. 1-96 (text provided on CD-ROM).

Oracle Corporation, "Oracle® Configurator Developer, User's Guide," Release 11i for Windows 95/98/2000 and Windows NT 4.0, Apr. 2002, Part No. A87529-04, pp. 1-330.

Oracle Corporation, "Oracle® Configurator, Performance Guide," Release 11i, Apr. 2002, Part No. A95986-01, pp. 1-138.

Oracle Corporation, "Oracle® Configurator, Release Notes," Release 11i, Aug. 2002, Part No. A73283-12, pp. 1-96.

* cited by examiner

TECHNIQUES FOR PARTIAL LOADING OF A CONFIGURATION ASSOCIATED WITH A CONFIGURATION MODEL

FIELD OF THE INVENTION

The present invention relates generally to constrained configuration-models and, more specifically, to techniques for partial loading of model nodes and constraints.

BACKGROUND OF THE INVENTION

When defining a configuration model in a classic constraint programming system, the modeler must describe the problem space in terms of variables and constraints, where a constraint is a logical relation among variables. A model is an abstract classification of model variables. Constraints restrict the possible values that variables can take and they represent some partial information about the variables of interest, with respect to other variables to which the variables are related. The term "configuration" is used herein to refer to an instance of one configuration model.

CONSTRAINT PROGRAMMING TERMS AND TECHNIQUES

The idea of constraint programming is to solve problems by stating constraints, such as rules, conditions or properties, which must be satisfied by a valid solution. A paper by Roman Bartak entitled "Constraint Programming: In Pursuit of the Holy Grail" in Proceedings of the Week of Doctoral Students (WDS99), Part IV, MatFyzPress, Prague, June 1999, pp. 555–564, provides an overview of constraint programming concepts, and is incorporated by reference in its entirety for all purposes as if fully set forth herein. Some of the pertinent concepts and terminology are described as follows.

(A) A Constraint Satisfaction Problem (CSP) is a problem with a given set of variables, a given set of values (called domain) for each variable, and a given set of constraints. Each constraint restricts the values, from the set of values, that may be simultaneously assigned to each variable of a set of variables.

(B) Arity of Constraints is the number of variables in a constraint. A Binary Constraint is a constraint between two variables. Constraints with higher arity than two can be represented with Binary Constraints.

(C) A Solution is a combination of assignments of values to each variable that is consistent with all constraints.

(D) Search is the process of generating a Solution.

(E) Generate and Test is the most trivial algorithm (Search) for solving a CSP. Such an algorithm generates all possible combinations of values and tests whether each combination satisfies all constraints. The complexity of this algorithm is exponential to the number of variables and number, number of values for each variable and number of constraints. A CSP is a combinatorial problem that is computationally complex.

(F) Consistency Techniques are used to reduce the complexity of a CSP by removing inconsistent values from the variable domains in order to reduce the complexity of Search. Examples of Consistency Techniques include Node consistency, Arc consistency, Path consistency, and the like.

(G) Arc Consistency assumes that all variables that are associated with a single node are consistent within that node (Node Consistent) and that all constraints between nodes (Connection Constraint) contain two variables. Connection constraints are represented as an arc between two nodes. An arc is arc consistent if there are no values in either node that are inconsistent according to the connection constraint arc.

APLLICATION OF CONSTRAINT PROGRAMMING TO CONFIGURATION MODELS

For example, a manufacturer or service provider may desire the ability to construct products or service suites based on different product or service options represented in a model. In the process of constructing a version of a product or service suite, selected options must be validated against each other to ensure consistency. In other words, the constraints or rules associated with related options must be enforced to ensure a correct solution within the framework and parameters of the model.

A common approach to constructing and managing large problem spaces is to model all of the problem space entities into instances of some number of abstract model variables, thereby minimizing the effort of modeling and maintenance. However, the execution of such a model requires that the entire configuration, i.e., all of the variable instances and all of their constraints, be actively engaged in the system to ensure the correctness and integrity of propagation of changes to the variable instances. Thus, in order to perform effectively, a Configurator system loads the entire configuration data into volatile memory or implements other ways to keep all variable instances and constraints engaged. For models that contain a large number of variables and constraints, such an approach is prohibitive, primarily due to the amount of resources that are used to load an entire configuration of a model.

Based on the foregoing, there is a clear need for techniques for reducing the resource consumption currently associated with configurations, especially with respect to constraint-based modeling.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for managing partial loading of configurations associated with constrained models. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example of Applicability

Figure 3A:
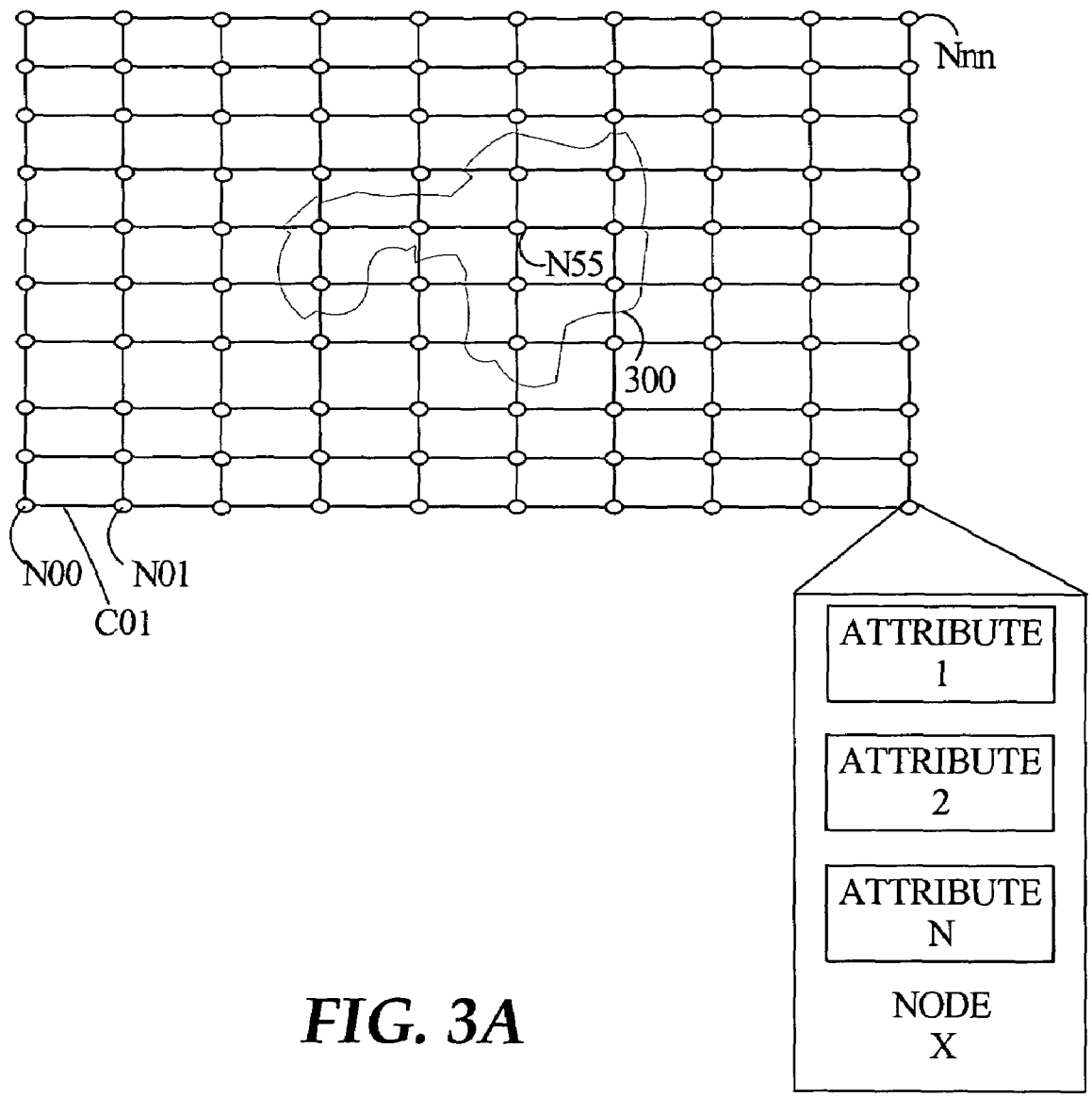
FIG. 3A is a diagram that illustrates a simplified configuration.

Presented as an example of an area of applicability of the techniques described herein, such techniques may apply to Constraint Satisfaction Problems in which variables are grouped by some meaningful (to the modeler) criteria in what is referred to as "instances". Each instance contains a finite number of variables and a finite number of constraints. Constraints between variables from different instances are sometimes referred to as "connection constraints". The entire CSP consisting of one or more instances is sometimes referred to as a network of instances, connected among each other through connection constraints (as generally depicted in FIG. 3A).

From constraint theory, an important fact about arc consistency is that a CSP may be arc consistent but may not have a solution. Nevertheless, if N–1 variables in a CSP are already assigned and there is arc consistency for all constraints with the Nth variable, there certainly is a solution to the CSP that involves the already assigned variables plus an assignment of the Nth variable.

The goal of configuring the network is to assign values to all variables (e.g., a Solve), such that they are consistent within the instance (e.g., a local solution) and within the entire network (e.g., a global solution). Therefore, if N–1 instances in the network are already solved and there is arc consistency for all connection constraints with the Nth instance, then there is a solution to the network that involves the already solved instances plus a local solution to the Nth instance. Hence, the techniques described herein are applicable to configuring an unsolved instance in the presence of one or more solved other instances.

Models and Configurations

In the context of an implementation of the techniques described herein, a model is a design-time abstraction for a group of model entities. Each model entity could be a lower level grouping entity, a variable, or a reference to another model. Variables do not have values yet, rather just their types (boolean, integer, decimal, etc) and their domains ([true, false] or [0, 100], etc.) are defined. In the case of a reference to another model, the other model is considered part of the first model (a sub-model). A sub-model could be defined as (a) required or (b) instantiable. Constraints are defined as relationships between variables from the first model (root model) or any sub-models. All of this information (structure and relations) is commonly referred to as meta-data or Model data.

At runtime, a Configuration session is commenced by instantiating a Model, which implicitly instantiates sub-models and variables. The instantiation of sub-models is based on their definition of being required or instantiable. If required, the sub-model is unconditionally instantiated as part of the root model. If instantiable, the sub-model is instantiated either when the user demands it explicitly or when a constraint propagates a change to the cardinality of the sub-model.

In the process of configuring, the goal is to assign values to all variables, thus "completing" the Configuration (in this sense, the Configuration represents the Problem). A Configuration can be saved in a database or files or whatever other medium, and loaded again regardless of whether it is complete or incomplete. The information about the instances and values assigned to variables is what is referred to as runtime data or Configuration data.

Generally, an instance of a Model is referred to as an Instance. In an implementation, a root CONTAINER model is defined which includes with one or more instantiable references to other Models (sub-models). It is the Instances of those sub-models that are depicted as the Nodes in an Instances graph, and it is the constraints between different instances that are depicted as Arcs in the Instances graph.

Terminology

Embodiments of the invention are described in reference to a model that includes general descriptions of associated constituent model entities, e.g., sub-models, and to an instance of the model and its constituent entity instances.

The term "node" is used herein to refer to an instance of an instantiable sub-model, or an Instance.

The term "configuration" is used herein to refer to runtime information about all nodes and values assigned to variables associated with nodes.

The term "constraint" generally refers to the relationship between one or more variables of the same or different nodes. Throughout the description, the term "connection constraint" is used to generally refer to rules, conditions, relationships, properties or the like, between two or more nodes, typically in the context of a configuration associated with a model and its constituent interrelated and interdependent entities. If a change or modification to a node, including addition of such node to a configuration could violate a connection constraint, then the constraint is said to "restrict" the change or modification.

Furthermore, while the techniques described herein may be implemented using constraint programming techniques, use of the term "constraint" throughout the description does not mean that constraint programming techniques must be used to implement the techniques. Rather, "constraint" and "connection constraint" are used as general terms as defined above, unless otherwise indicated.

"Neighboring nodes" refers to any two nodes that have at least one constraint or condition between them. For example, in a telecommunication context, instances of a port and a related connector would qualify as "neighboring nodes" if they were constrained by a rule that the throughput of the connector must be greater than or equal to the throughput of the port.

An "active node" refers to a portion of a configuration (sometimes represented as an Instance graph) that a user is currently working on, e.g., a node that is being added or modified. Hence, active nodes are currently being solved and their variables could typically be modified (e.g., change the throughput of a port).

There is a certain set of solved nodes surrounding an active node that may be restricting the change of the active node via a connection constraint between a given solved node and the active node. The members of this set of nodes that might be restricting the change of an active node are referred to as "passive" nodes. Variables of passive nodes are typically assigned values and cannot be modified. The solved nodes beyond the set of passive nodes are referred to as "constant" nodes.

Partial Model Loading Overview

Techniques are provided in which, to facilitate a modification to a configuration, only a portion of that configuration is loaded into volatile memory rather than the entire configuration. In the context of a constraint-based or rule-based model, in which model entities are interrelated by constraints, rules, conditions or the like, addition of and changes to nodes need to be validated against relevant constraints. A validation process includes propagating the addition or change throughout the configuration. The techniques described herein provide a mechanism for performing such validation without loading into volatile memory the entire configuration. Hence, a more resource-efficient and better performing system is provided.

According to one aspect, only a portion of a configuration is loaded into a Configurator system, on demand from a user, rather than the entire configuration. At runtime, all model data (e.g., metadata associated with models, references, variables, constraints) is loaded in order to know what needs to be instantiated and when. Then, to be able to configure Customer X's network, the root model is first instantiated and then as many configuration instances (i.e., Instances of the sub-models) are loaded from the database or other storage mechanism as explicitly requested by the end user. Those instances become the "active nodes" in volatile memory. Then, internally the Configurator system queries the configuration data for connection constraints between the active nodes and any other Instances in the database. Such other Instances are loaded as "passive nodes".

The model includes a set of nodes with associated node variables and a set of connection constraints. In an embodiment, an intended modification of a node is received. For example, a user may be reconfiguring a configuration by adding a new node Z connected to a node Y. Thus, the user requests creation (or, generally, a "modification") of a node that represents an instance of a model entity class. Or if changing an existing node, say node Y, the user requests changing the value in a variable in node Y. Regardless, the node to which the intended modification is requested is established to be the active node and associated information is loaded into volatile memory.

Such an intended modification is received in the Configurator system and in response, a subset of the set of connection constraints is determined. The subset of connection constraints includes all constraints that restrict the intended modification, with the subset including fewer constraints than the set of connection constraints. Further, a subset of the set of node variables is determined. The subset of node variables includes all variables that cause an associated connection constraint to restrict the intended modification. In other words, the subset of node variables contains the variables that may be affected by the intended modification. The subset of node variables includes variables associated with the node being modified, i.e., the active node, and a set of passive nodes. For example, a query or "fetch" is made for all nodes that are connected to node Y and the connection constraints between node Y and each of these connected nodes. For another example, a query is made for constraints that include a particular attribute that is associated with node Y and whose value may affect or be affected by the consistency of a constraint related to node Y. Determining the subsets of constraints and node variables may involve one query or may involve multiple iterative queries.

To determine whether the intended modification violates any of the connection constraints, subsets of node variable information is loaded into volatile memory. The subset of node variable information includes node variable information about only the subset of nodes, rather than information about all of the nodes of the model.

Because only a subset of the configuration is loaded, much fewer resources are consumed. Thus, more sessions can be concurrently active on a given computing platform and each session runs faster than it would using prior approaches. Furthermore, these techniques provide the ability for multiple users to concurrently work on a single configuration as long as their workspace does not overlap.

According to one aspect, the neighborhood of nodes is dynamically extended. Such a process is referred to as "neighborhood extension" and may result from, for example, a user navigation action or a change to the active node that would require a change in a related passive node, by way of a connection constraint, in order to maintain consistency. For example, a change is made to active node Y. As part of a validation or "consistency maintenance" process, it is determined that the change to node Y propagates to a related node X whereby a change is introduced in node X because of the connection constraint between node Y and node X and because of the goal of maintaining a consistent configuration. Consequently, node X is deemed an active node and it is determined which nodes now are passive nodes based on their relation to the active node X by way of connection constraints. Information about the new active node, node X, and the new related passive nodes is loaded into volatile memory.

Operating Environment

Figure 1:
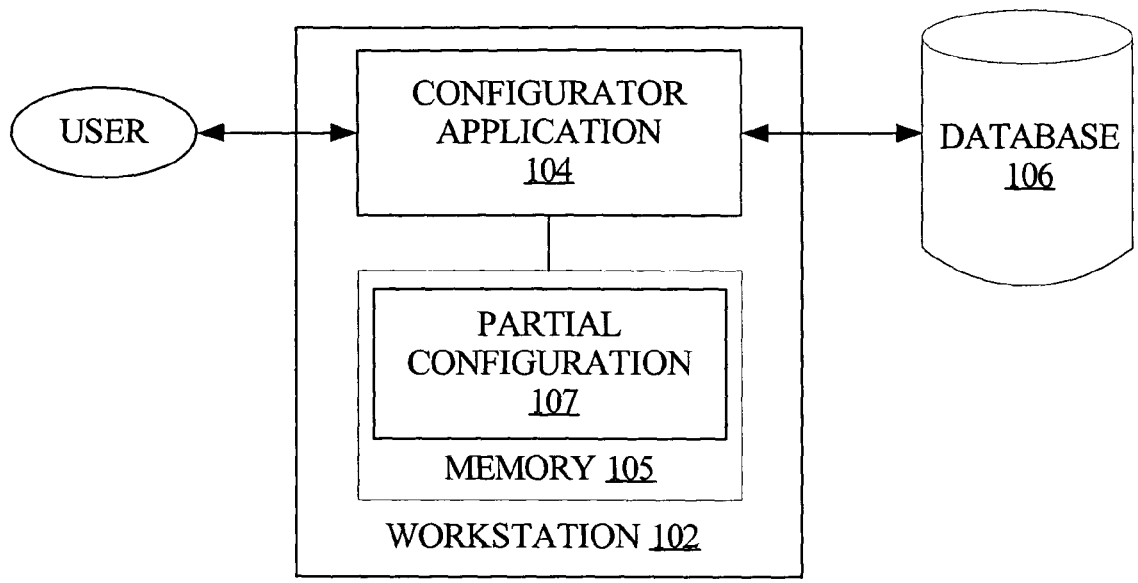
FIG. 1 is a block diagram that illustrates an operating environment in which embodiments of the invention may be implemented.

FIG. 1 is a block diagram that illustrates an operating environment in which embodiments of the invention may be implemented.

The operating environment includes a workstation 102 having a configurator application ("application") 104 and a memory 105. Application 104 comprises executable instructions that are executed by a processor in workstation 102, for performing techniques for partial loading of configuration information as described herein. Memory 105 at times stores a partial configuration 107, according to embodiments. Workstation 102 is communicatively coupled to a database 106. Database 106 is a repository for storing data, metadata and other information. For example, database 106 stores configuration information, represented as data and metadata. The manner in which configuration information is stored in database 106 may vary from implementation to implementation. For example, configuration information may be stored in relational data tables; however, embodiments are not so limited.

A user with access to workstation 102 can construct and configure a model using the application 104. A model represents a generic framework of a solution, or of many possible solutions, to a problem, and includes classification of the associated model entities. The problem spaces to which models can be constructed are essentially limitless. For non-limiting examples, a model may represent an apparatus, such as an automobile, with various option packages; a system such as a telecommunications network, with various hardware, software, protocol and service options; a suite of available services; a suite of software applications; and the like, all of which comprise interrelated and interdependent options.

A model may be represented abstractly, using object classes, from which objects are instantiated to form nodes. Such object classes may include business rules or conditions, referred to as constraints, which are applicable to objects instantiated from respective classes. For example, object class A may include a constraint that object A instances have a particular relationship with object B instances instantiated from object class B (e.g., an attribute of object A>a similar attribute of object B). Similarly, object class B may include a constraint with respect to object class A (e.g., an attribute of object B<a similar attribute of object A). For example, an owner of a private telecommunications network, which it leases use of to its customers, may develop business rules into a model that represents service packages associated with the network.

Once constructed, a model may be stored in database 106 via application 104, in the context of the user being the model constructor. Further, customers may be provided or given access to the model. For example, a customer of the network owner may be provided the network service model, for instantiation into a configuration representing the customer's particular network and service configuration. Such configurations may be stored in database 106 via application 104. The model, configurations and nodes are typically stored in database 106 in the form of data and metadata. As described in further detail below, in response to a user request, the application 104 accesses database 106 to perform queries on model configuration information. Based on the configuration information, determinations are made regarding partial loading of the requested model configuration, such as partial configuration 107.

Functional Architecture Overview

Figure 2:
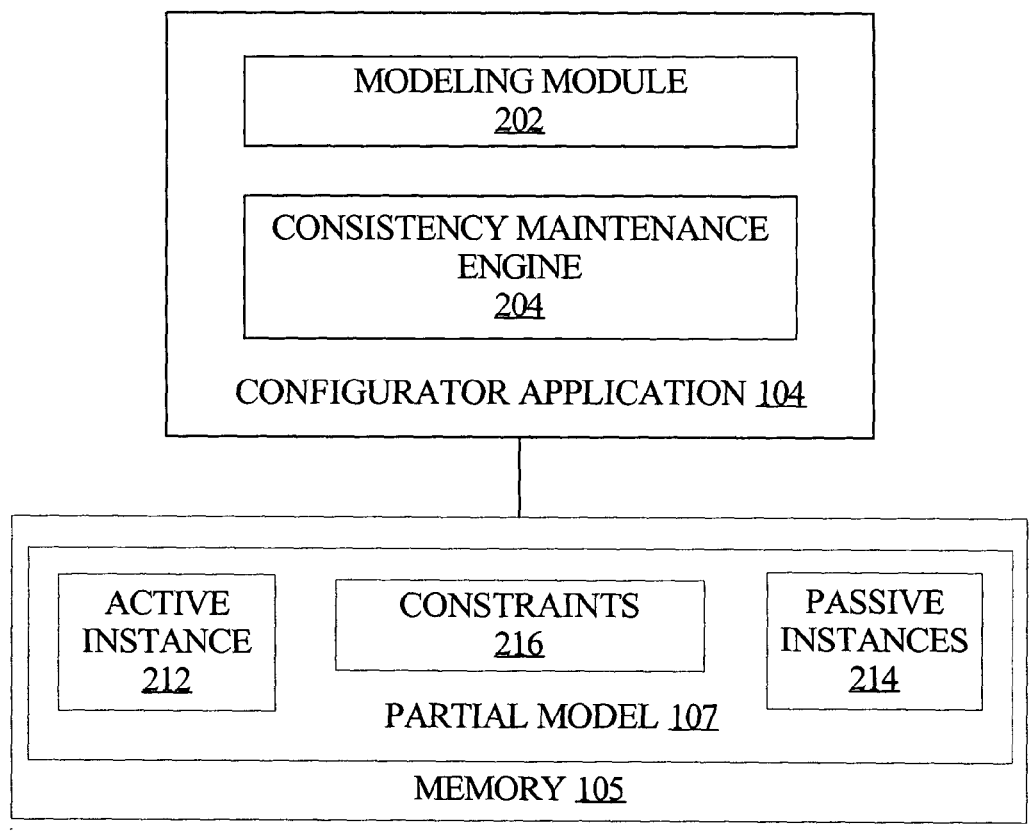
FIG. 2 is a block diagram that further illustrates functional components of a configurator application and contents of a memory.

FIG. 2 is a block diagram that further illustrates functional components of configurator application 104 and contents of memory 105.

Application 104 comprises a modeling module 202 and a consistency maintenance engine ("engine") 204. The modeling module 202 provides a modeling environment for facilitating the construction of models by users. For example, modeling module 202 may present a user interface to a user at workstation 102 (FIG. 1), through which a graphical depiction of a model may be constructed. The form in which models take may vary from implementation to implementation. For example, models may be represented in a proprietary format or in UML (Universal Modeling Language). In an embodiment, modeling module 202 comprises a constraint programming engine, which employs constraint programming techniques in representing models and configurations.

Consistency Maintenance Engine

Engine 204 provides a runtime environment for facilitating the loading and modification of configurations, such as those stored in database 106 (FIG. 1). Engine 204 maintains and manages relationships between entities, such as constraints associated with related nodes. Engine 204 applies, or enforces, the constraints specified in a given configuration to ensure constraint satisfaction and to solve the relevant constraint satisfaction problem (refer to Section 3 of the Bartak reference). In other words, the engine 204 maintains the consistency of the configuration, as defined by the constituent model nodes and the associated constraints.

In an embodiment, engine 204 checks the consistency of pertinent constraints and reports thereon, rather than setting attribute values to solve the problem. In an embodiment, engine 204 further provides or suggests values for a given attribute that will keep the configuration in a "consistent" state by keeping the relevant model nodes consistent with their associated constraints.

In prior approaches to maintenance and manipulation of constraint-based model configurations, the entire configuration is loaded into local volatile memory upon a request to manipulate or solve a particular portion of the configuration, such as an entity, component, node, instance or the like. Returning to the telecommunication network example, one of the network owner's customers may have thousands of locations, or nodes, distributed across the country. In such a scenario, the entire network of nodes along with their attributes and relationships are loaded into the volatile memory of a computer system whenever a customer user wants to add or manipulate a single node in the network because the effect of the change needs to be evaluated throughout the entire network. Therefore, the change needs to be propagated throughout the configuration to determine its effect on the consistency of the configuration relative to its framework of constraints.

Model Example

FIG. 3A is a diagram that illustrates a simplified configuration. The configuration is depicted as a 10×10 grid of model entities, or nodes, N00, N01–Nnn. Each node N00, N01–Nnn has relationships with its neighboring or adjacent nodes, illustrated by the line segments connecting any two nodes. Connection Constraint C01 depicts the constraint or relationship between or associated with nodes N00 and N01. If a given constraint between two nodes is satisfied, then the nodes are said to be "arc consistent".

Each node N00, N01–Nnn has associated attributes or properties, illustrated as attribute 1, attribute 2, attribute N of node X. With prior approaches, when a user selects node N55 and requests that it be activated to place N55 in an editable state, the entire configuration is loaded into volatile memory such, as RAM. That is, every node N00, N01–Nnn and every attribute and every constraint is loaded. With large complex models, loading the entire instance can be resource-intensive. By contrast, with the techniques described herein, only a portion of the configuration is loaded.

The "knowledge" that a given configuration is solved, or consistent, with respect to its constraint satisfaction framework provides valuable insight to engine 204 in relation to its tasks associated with maintaining consistency upon a change to the configuration. The "constant" nodes can be safely removed from the working problem space because the effect of the constant nodes on the active node is enforced by the passive nodes and the constraints between them and the active nodes. Returning to the telecommunication network example, if a user wants to add a port instance to a particular permanent virtual circuit (PVC) instance of a frame relay network instance, and the particular PVC is already consistent with the rest of the network, then as long as the new port is consistent with the particular PVC, the new port is consistent with the rest of the network. Hence, the entire configuration does not have to be loaded when using the techniques described herein.

For example, the nodes encompassed by the shape 300 of FIG. 3A may be the only nodes that need to be loaded because the nodes encompassed by the shape 300 are the only nodes that may be affected by a change to node N55, directly or indirectly by way of the respective constraints. Within shape 300, nodes adjacent to node N55 are directly affected by changes to variable values associated with node N55 (e.g., passive nodes) and nodes that are not adjacent to node N55 are indirectly affected by such changes (e.g., extended passive nodes). Thus, according to techniques described herein, the loading of configuration information is an iterative process, whereby (1) passive nodes are first loaded, (2) an intended modification is solved for the local neighborhood, (3) extended passive nodes are determined based on the solution applied to the local neighborhood, (4) extended passive nodes are loaded, thus extending the neighborhood, and (2)–(4) are repeated until all of the effects of the intended modification are considered.

Figure 3B:
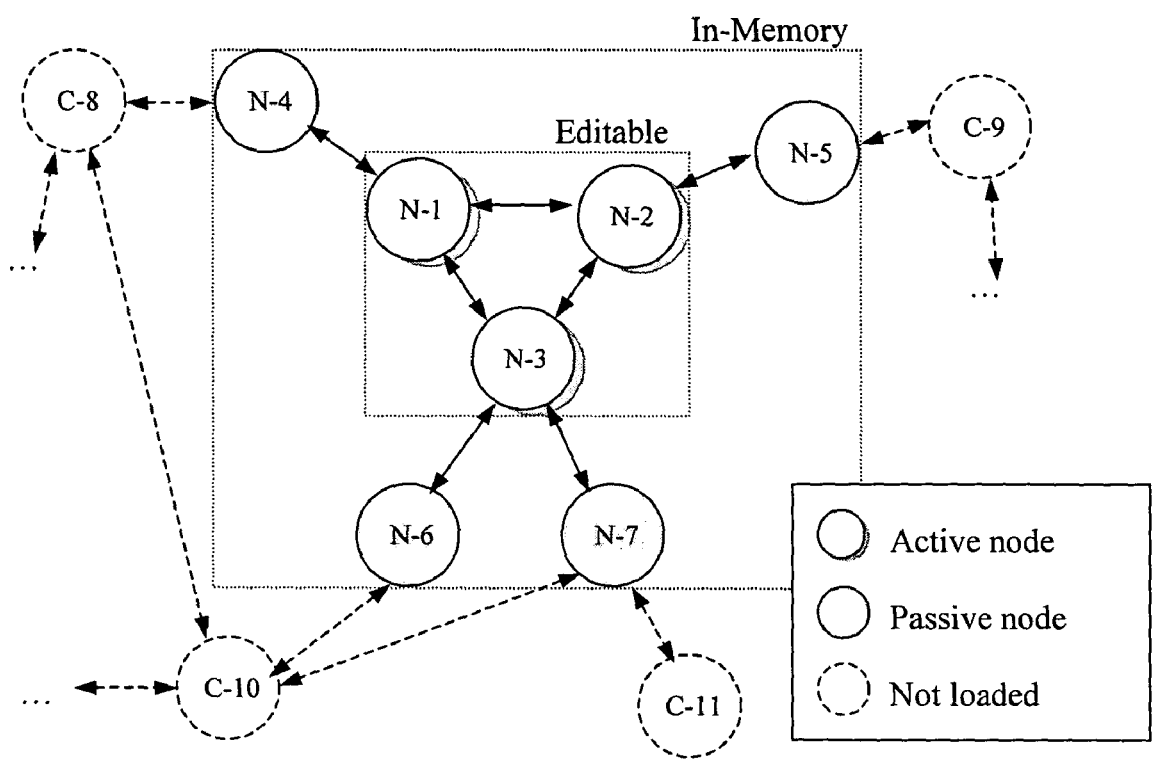
FIG. 3B is a diagram that illustrates a "local neighborhood" of a configuration.

FIG. 3B is a diagram that illustrates a "local neighborhood" of a configuration, according to an aspect of the invention. The local neighborhood illustrated in FIG. 3B depicts a subset of a configuration, where the subset is loaded in volatile memory in association with a modification enactment phase of processing.

Active nodes N-1, N-2, N-3 are loaded into volatile memory with respective structure and complete sets of constraints and are, therefore, editable. Passive components are loaded into volatile memory with respective structure and only connection constraints. Passive nodes N-4, N-5, N-6, N-7 are asserted as constants and, therefore, are not editable. According to the techniques described herein, all other components of the configuration, such as C-8, C-9, C-10, C-11, need not be instantiated and loaded into volatile memory for a given iteration of the process. Components such C-8, C-9, C-10, C-11 may be instantiated and loaded into volatile memory during a subsequent neighborhood extension process.

A purpose of loading the passive nodes is to ensure that the connection constraints of the model are in place to consistently validate the active nodes being edited. As a result, not loading indirectly connected nodes drastically reduces the complexity of a configuration session down to the size of the local neighborhood of the model.

Method for Managing a Model Configuration

Figure 4A:
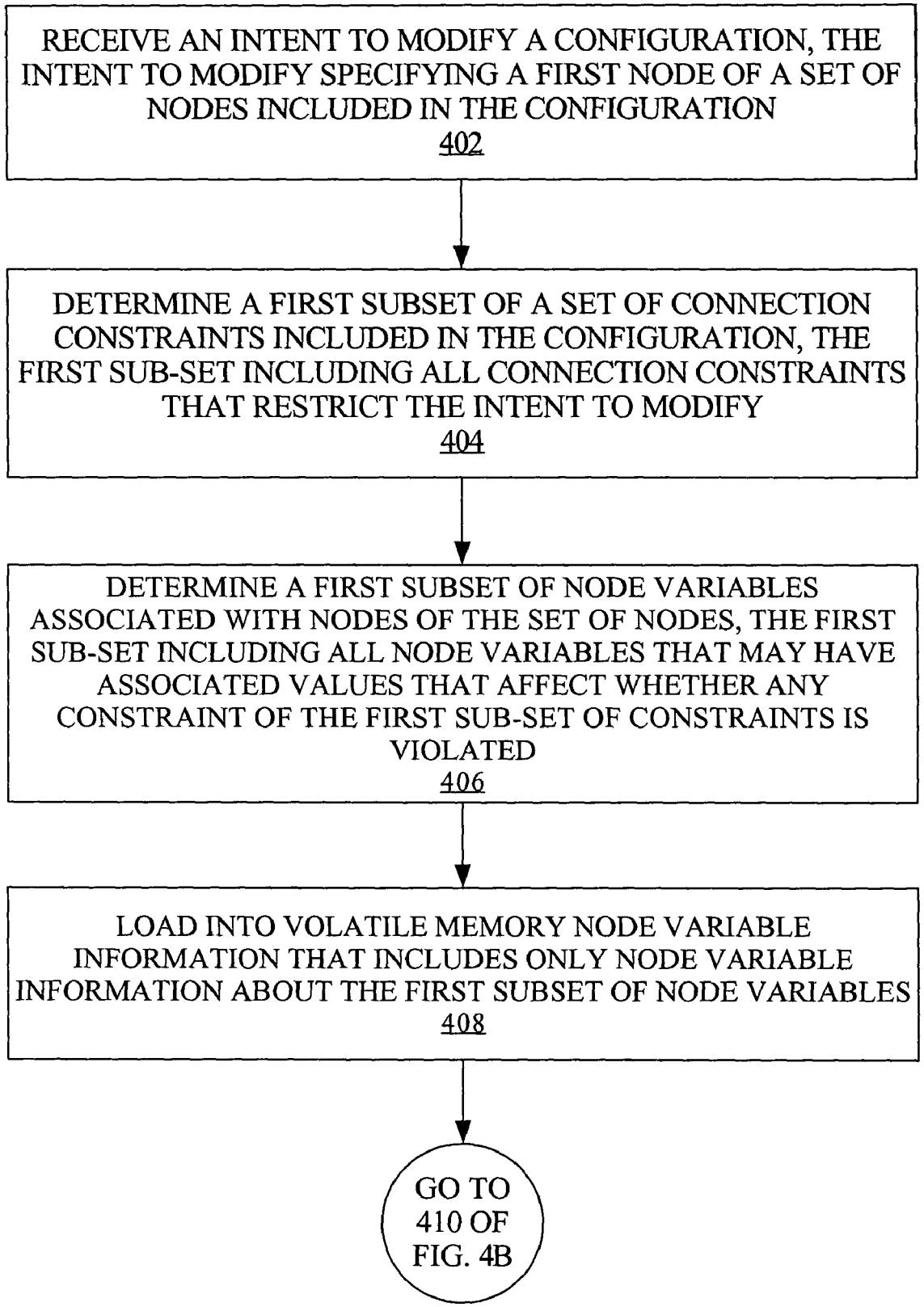
FIG. 4A is a flow diagram that illustrates a method for managing an instance of a model that includes a set of nodes and a set of constraints.

FIG. 4A is a flow diagram that illustrates a method for managing an instance of a model that includes a set of nodes and a set of constraints. The method of FIG. 4A may be performed by, for example, the consistency maintenance engine 204 (FIG. 2) of the configurator application 104, or a similarly functioning application.

Partial Loading of Configuration

At step 402, an intent to modify the configuration is received which specifies a first node of the set of nodes. For example, a user may select an existing node for modification or commence an operation to add a new node to the configuration. The consistency maintenance engine 204 (FIG. 2) receives the intent to modify and proceeds to the following steps.

At step 404, a first subset of connection constraints is determined, which is a subset of the set of model connection constraints. The first subset of connection constraints is determined based on at least the first node and includes all constraints, from the set of constraints, that restrict the intent to modify. As previously described, a modification is restricted by all constraints that could possibly be violated by the modification, as is an intent to modify. In other words, restricting constraints may affect the values that a constrained variable may take. The first subset of constraints includes fewer constraints than the set of constraints. In an embodiment, the first subset of constraints includes only the constraints that restrict the intent to modify.

At step 406, a first subset of node variables is determined. The first subset of node variables is associated with nodes of the set of model nodes. The first subset of node variables includes all node variables that are associated with values that may affect whether any of the constraints of the first subset of constraints is violated. In other words, any node variable that has an attribute with a value that may affect whether a constraint from the first subset of constraints is violated, e.g., the attribute is a variable that is associated with or an argument of the constraint, is included in the first subset of node variables.

In what order steps 404 and 406 are performed is a detail of design choice that may vary from implementation to implementation. Furthermore, steps 404 and 406 may be performed concurrently. For example, a single query may be run against one or more data tables to determine the first subsets of node variables and constraints. In other words, a query may be run to determine which nodes are passively related (i.e., passive nodes) to the node being modified (i.e., the active node), and by which constraints the passive nodes are related to the active node. In an implementation in which the subset of constraints is determined before the subset of nodes, then determination of the first subset of node variables is based at least on the first subset of constraints.

After execution of steps 404 and 406, identification of sets of information about relevant nodes, node variables and constraints has been completed. For example, the subsets of node variables and constraints encompassed by the shape 300 of FIG. 3A are determined, from the complete set of nodes N00-Nnn and the complete set of adjoining constraints.

At step 408, a first subset of node variable information is loaded into volatile memory, such as RAM. The node variable information describes the current configuration of the respective portion of the configuration, and may be in the form of data and metadata. The active node is loaded with its structure and complete set of associated rules and, therefore, is editable. The passive nodes are loaded with structure and constraints and, therefore, are not editable. The subset of nodes includes the active node and at least the first-level passive nodes, which are nodes directly connected to the active node via a constraint.

In an embodiment, the subsets of information are loaded into memory associated with a Java Virtual Machine (JVM). In an embodiment, a representation of the first subset of constraints and the first subset of node variables is displayed. For example, consistency maintenance engine 204 (FIG. 2) causes graphical representations of the constituent nodes and constraints to be displayed on a workstation 102 (FIG. 1) monitor or other display means.

Significantly, the subset of node variable information that is loaded includes only node information about the first subset of nodes. Other types of information may already be in the volatile memory or may be loaded during execution of the process. However, only information about the subset of node variables is loaded, rather than information about other nodes outside of the subset or about all of the nodes and constraints in the configuration. Hence, partial loading of the configuration is accomplished and benefits regarding resource usage and system performance are obtained. A user can work on one node at a time without having to load the entire configuration. Hence, the user can perform a sequence of operations on a sequence of nodes, involving (a) changing a node, (b) validating the change, (c) saving the configuration, (d) moving to the next node, and repeating such steps.

In an embodiment, a further optional step includes indicating that a constraint is or would be violated by the modification. For example, a change to a value of an attribute of node X may cause an inconsistency with a relevant constraint. Returning to the telecommunications network example, a user may try to change the throughput value of a particular port to a value that exceeds the throughput capacity of a related connector or circuit, thereby violating a constraint that maintains that the throughput of all connectors must be greater than or equal to connected ports. For another example with respect to automobile option packages, a user may try to add an option package that includes a roof rack in conjunction with an option package that includes a sun-roof, thereby violating a constraint that maintains that that model of automobile cannot physically be configured with a roof rack and a sun roof In such a scenario, the consistency maintenance engine 204 (FIG. 2) indicates that a constraint is violated, by displaying a message on a user interface, for example. In addition, the constraint or constraints that are violated may be indicated.

In an embodiment, another optional step includes providing a set of one or more values for the first node, i.e., the node being modified, that do not violate any of the constraints of the complete set of model constraints. For example, the consistency maintenance engine 204 (FIG. 2) may provide upper or lower values or a range of values for a particular attribute of a node, thereby providing guidance regarding possible values that are consistent with the existing configuration. Such information may be provided by displaying a message on a user interface, for example.

FIG. 4A refers to the intent to modify. Thus, steps 402–408 are typically performed at initial configurator system load time. At interaction time, the following is performed. First, an actual modification to the first node is received at the configurator system, such as a modification request from a user. Such a request includes an explicit change to the value of a variable associated with the first node. The request is propagated throughout the configuration using the conventional method of propagating changes in a generic configuration.

If the requested modification attempts to change a variable value associated with a passive node, or attempts to change a variable value associated with the active node where the variable is restricted by a connection constraint from a passive node, then extension of the neighborhood is considered.

Neighborhood Extension

Figure 4B:
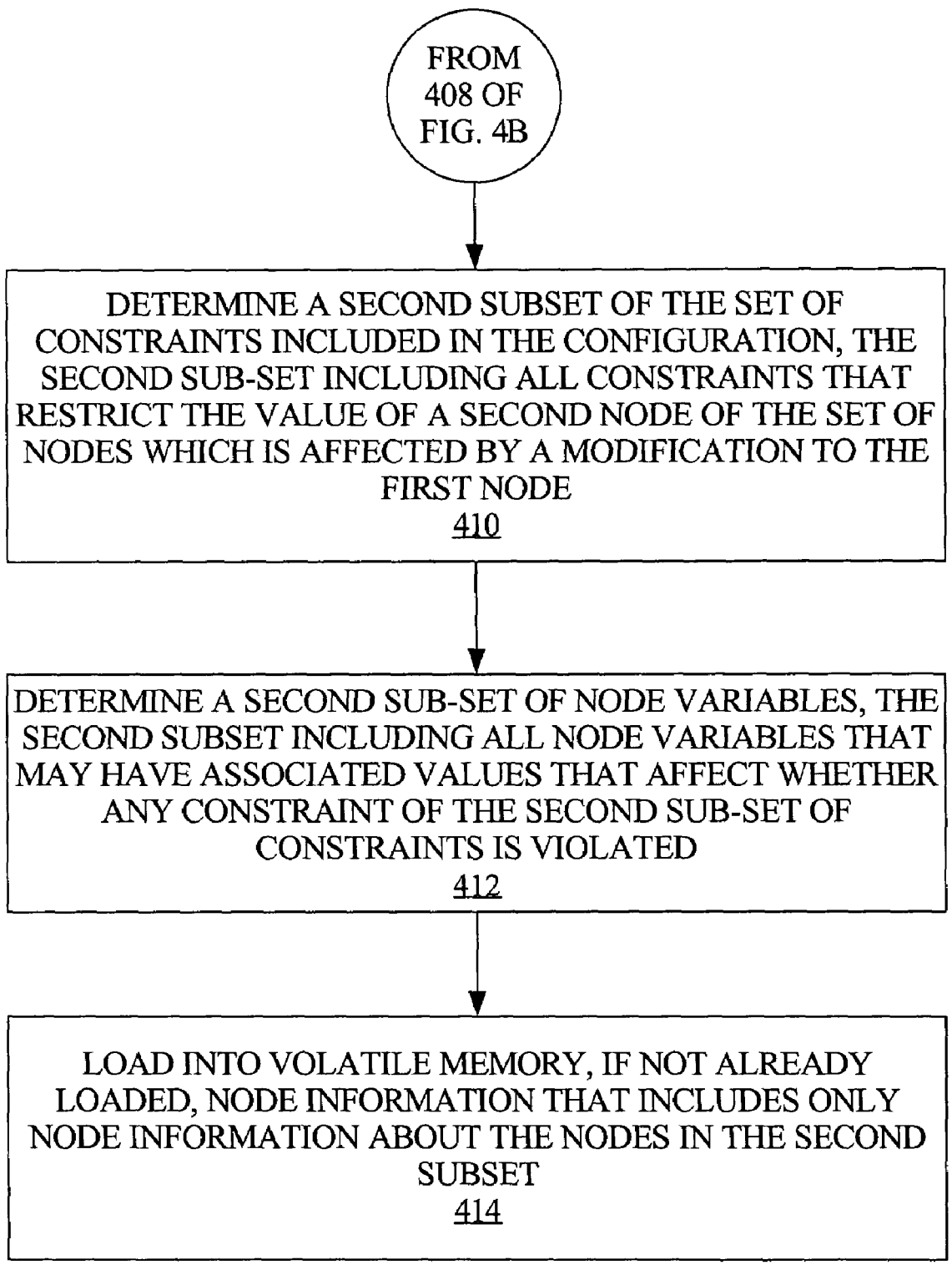
FIG. 4B is a flow diagram that illustrates an optional continuation of the method for managing an instance of a model that is illustrated in FIG. 4A.

FIG. 4B is a flow diagram that illustrates an optional continuation of the method for managing an instance of a model that is illustrated in FIG. 4A. The method of FIG. 4B illustrates the "neighborhood extension" process previously discussed. The method of FIG. 4B may be performed by, for example, the consistency maintenance engine 204 (FIG. 2) of the configurator application 104, or a similarly functioning application.

Steps 410–414 are executed dynamically upon a determination that a value associated with a second node of the first subset of nodes is affected by the actual modification received. The value may be for an attribute of the second node, such as attribute N of node X (FIG. 3A). The dynamic neighborhood extension process may be automatically performed by consistency maintenance engine 204 (FIG. 2) or upon user choice or selection. At step 410, a second subset of constraints is determined, which is a subset of the set of model constraints. The second subset of constraints includes all constraints from the set of constraints that restrict the value of the second node. If a value associated with a node could violate a constraint, then the constraint is said to "restrict" the value or "restrict" the associated attribute.

At step 412, a second subset of nodes is determined, which is a subset of the set of model nodes. The second subset of nodes includes all nodes that are associated with values that may affect whether any of the constraints of the second subset of constraints is violated. The second subset of nodes may include formerly "constant" nodes. In what order steps 410 and 412 are performed is a detail of design choice that may vary from implementation to implementation. Furthermore, steps 410 and 412 may be performed concurrently, as with steps 404 and 406 of FIG. 4A.

At step 414, to determine whether the value of the second node violates, or would violate, any of the constraints from the set of model constraints, a second subset of constraint information and a second subset of node information are loaded into volatile memory, if not already loaded. In an embodiment, a representation of the second subset of constraints and the second subset of nodes is displayed. For example, consistency maintenance engine 204 (FIG. 2) causes graphical representations of the constituent nodes and constraints to be displayed on a workstation 102 (FIG. 1) monitor or other display means.

Significantly, the second subset of constraint information includes only constraint information about the second subset of constraints and, similarly, the second subset of node information includes only node information about the second subset of nodes. Only information about the second subsets of constraints and nodes, which has not already been loaded, is loaded, rather than information about other nodes and constraints outside of the second subsets or about all of the nodes and constraints in the configuration. Hence, partial loading of a model configuration employing neighborhood extension is accomplished.

The iterative process of (1) receiving and propagating an actual requested modification, and (2) extending the neighborhood may be performed sequentially (e.g., 1, 2, 2, 2) or in parallel (e.g., 1, 1, 1 in parallel with 2, 2, 2).

Hardware Overview

Figure 5:
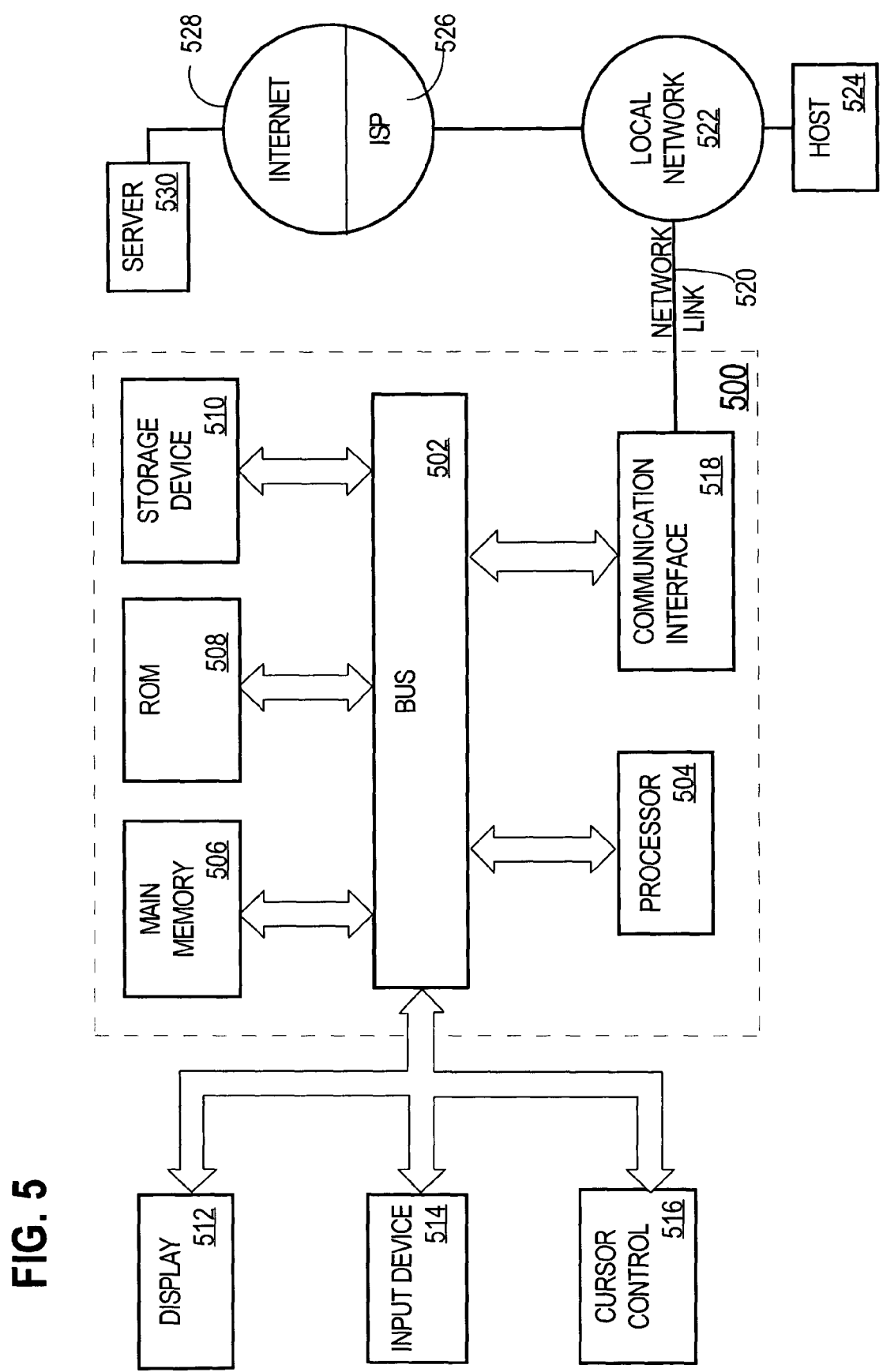
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, optical disk, or magneto-optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical, magnetic, or magneto-optical disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions And Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing an instance of a model, wherein the instance includes a set of nodes with associated node variables and a set of connection constraints, the method comprising the computer-implemented steps of:

receiving an intent to modify the instance, wherein the intent to modify specifies a first node of the set of nodes;

loading into volatile memory information associated with said first node;

determining, based at least on said information associated with said first node, a first subset of said set of connection constraints, wherein said first subset of connection constraints includes all connection constraints that restrict said intent to modify, and wherein said first subset of connection constraints includes fewer constraints than said set of connection constraints;

determining, based on said first subset of connection constraints, a first subset of node variables that are associated with nodes of said set of nodes, wherein said first subset of node variables includes all variables that may have associated values that affect whether any constraint of said first subset of connection constraints is violated; and loading into volatile memory a first subset of node variable information, wherein said first subset of node variable information includes only information about said first subset of node variables.

2. The method of claim 1, further comprising the computer-implemented steps of:

receiving a modification to said first node; and based on said first subset of node variable information and said set of connection constraints, determining whether said modification violates any constraint of said set of connection constraints.

3. The method of claim 2, further comprising the computer-implemented steps of:

upon a determination that a variable value associated with a second node of said set of nodes is affected by said modification, determining, based on said first subset of node variables, a second subset of said set of connection constraints, wherein said second subset of connection constraints includes all constraints that restrict said variable value associated with said second node;

determining, based on said second subset of connection constraints, a second subset of node variables that are associated with nodes of said set of nodes, wherein said second subset of node variables includes all variables that may have associated values that affect whether any constraint of said second subset of connection constraints is violated; and to determine whether said variable value of said second node violates any constraints of said set of connection constraints, loading into volatile memory, if not already loaded, a second subset of node variable information, wherein said second subset of node variable information includes only information about said second subset of node variables.

4. A computer-readable storage medium carrying one or more sequences of instructions which, when executed by one or more processors, causes the one or more processors to perform the method recited in claim 3.

5. A computer-readable storage medium carrying one or more sequences of instructions which, when executed by one or more processors, causes the one or more processors to perform the method recited in claim 2.

6. The method of claim 1, wherein said first subset of connection constraints includes only constraints that restrict said intent to modify.

7. A computer-readable storage medium carrying one or more sequences of instructions which, when executed by one or more processors, causes the one or more processors to perform the method recited in claim 6.

8. The method of claim 1, further comprising the computer-implemented step of indicating that a constraint of said set of connection constraints is violated by said intended modification.

9. A computer-readable storage medium carrying one or more sequences of instructions which, when executed by one or more processors, causes the one or more processors to perform the method recited in claim 8.

10. The method of claim 1, wherein said intended modification includes a change to said first node.

11. The method of claim 10, further comprising the computer-implemented step of indicating that a constraint of said set of connection constraints is violated by said change to said first node.

12. A computer-readable storage medium carrying one or more sequences of instructions which, when executed by one or more processors, causes the one or more processors to perform the method recited in claim 11.

13. A computer-readable storage medium carrying one or more sequences of instructions which, when executed by one or more processors, causes the one or more processors to perform the method recited in claim 10.

14. The method of claim 1, wherein said modification includes addition of said first node to said instance.

15. The method of claim 14, further comprising the computer-implemented step of providing a set of one or more variable values for said first node that do not violate any of said constraints of said set of connection constraints.

16. A computer-readable storage medium carrying one or more sequences of instructions which, when executed by one or more processors, causes the one or more processors to perform the method recited in claim 15.

17. A computer-readable storage medium carrying one or more sequences of instructions which, when executed by one or more processors, causes the one or more processors to perform the method recited in claim 14.

18. The method of claim 1, further comprising the computer-implemented step of causing display of a representation of said first subset of connection constraints and said first subset of node variables.

19. A computer-readable storage medium carrying one or more sequences of instructions which, when executed by one or more processors, causes the one or more processors to perform the method recited in claim 18.

20. The method of claim 1, wherein said first subset of node variables includes variables associated with a first set of one or more passive nodes, and wherein said first node is editable and said one or more passive nodes are not editable.

21. A computer-readable storage medium carrying one or more sequences of instructions which, when executed by one or more processors, causes the one or more processors to perform the method recited in claim 20.

22. The method of claim 1, further comprising the computer-implemented step of representing said model according to constraint programming techniques.

23. A computer-readable storage medium carrying one or more sequences of instructions which, when executed by one or more processors, causes the one or more processors to perform the method recited in claim 22.

24. A computer-readable storage medium carrying one or more sequences of instructions which, when executed by one or more processors, causes the one or more processors to perform the method recited in claim 1.

25. A system for managing an instance of a model that includes a set of nodes and a set of connection constraints, the system comprising:

means for receiving an intent to modify the instance, wherein the intent to modify specifies a first node of the set of nodes;

means for loading into volatile memory information associated with said first node;

means for determining, based at least on said information associated with said first node, a first subset of said set of connection constraints, wherein said first subset of connection constraints includes all connection constraints that restrict said intent to modify, and wherein said first subset of connection constraints includes fewer constraints than said set of connection constraints;

means for determining, based on said first subset of connection constraints, a first subset of node variables that are associated with nodes of said set of nodes, wherein said first subset of node variables includes all variables that may have associated values that affect whether any constraint of said first subset of connection constraints is violated; and means for loading into volatile memory a first subset of node variable information, wherein said first subset of node variable information includes only information about said first subset of node variables.

26. The system of claim 25, further comprising:

means for receiving a modification to said first node; and means for determining, based on said first subset of node variable information and said set of connection constraints, whether said modification violates any constraint of said set of connection constraints.

27. The system of claim 26, further comprising:

means for determining, upon a determination that a variable value associated with a second node of said set of nodes is affected by said modification and based on said first subset of node variables, a second subset of said set of connection constraints, wherein said second subset of connection constraints includes all constraints that restrict said variable value associated with said second node;

means for determining, upon a determination that a variable value associated with a second node of said set of nodes is affected by said modification and based on said second subset of connection constraints, a second subset of node variables that are associated with nodes of said set of nodes, wherein said second subset of node variables includes all variables that may have associated values that affect whether any constraint of said second subset of connection constraints is violated; and means for loading into volatile memory, if not already loaded, a second subset of node variable information to determine whether said variable value of said second node violates any constraints of said set of connection constraints, wherein said second subset of node variable information includes only information about said second subset of node variables.

\* \* \* \* \*